United States Patent
Bae et al.

(10) Patent No.: US 10,978,065 B2
(45) Date of Patent: Apr. 13, 2021

(54) STATIC ANALYSIS PERFORMING METHOD BASED ON VOICE INFORMATION AND DEVICE FOR THE SAME

(71) Applicant: SURESOFT TECHNOLOGIES INC., Seoul (KR)

(72) Inventors: Hyun Seop Bae, Seoul (KR); June Kim, Daejeon (KR); Seung-uk Oh, Seoul (KR); Min Hyuk Kwon, Gyeonggi-do (KR)

(73) Assignee: SURESOFT TECHNOLOGIES INC., Seoul (KR)

(*) Notice: Subject to any disclaimer, the term of this patent is extended or adjusted under 35 U.S.C. 154(b) by 175 days.

(21) Appl. No.: 16/218,138

(22) Filed: Dec. 12, 2018

(65) Prior Publication Data
US 2019/0180748 A1    Jun. 13, 2019

(30) Foreign Application Priority Data
Dec. 12, 2017   (KR) .................. 10-2017-0170716

(51) Int. Cl.
| | | |
|---|---|---|
| G10L 15/22 | (2006.01) | |
| G10L 13/08 | (2013.01) | |
| G10L 15/26 | (2006.01) | |
| G06F 11/36 | (2006.01) | |
| G06F 3/16 | (2006.01) | |

(52) U.S. Cl.
CPC .............. *G10L 15/22* (2013.01); *G06F 3/167* (2013.01); *G06F 11/3604* (2013.01); *G10L 13/08* (2013.01); *G10L 15/26* (2013.01); *G10L 2015/221* (2013.01); *G10L 2015/223* (2013.01); *G10L 2015/226* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 2003/0163323 A1* | 8/2003 | Bluvband | G10L 13/00 704/275 |
| 2012/0215759 A1* | 8/2012 | McCoy | G05B 15/02 707/709 |
| 2016/0357519 A1* | 12/2016 | Vargas | G06F 40/40 |
| 2018/0130463 A1* | 5/2018 | Jeon | G06F 16/3329 |

FOREIGN PATENT DOCUMENTS

| | | |
|---|---|---|
| JP | 2014-002565 A | 1/2014 |
| KR | 10-2008-0068385 A | 7/2008 |
| KR | 10-2010-0111164 A | 10/2010 |
| KR | 10-2011-0013182 A | 2/2011 |

OTHER PUBLICATIONS

Korean Intellectual Property Office, Notification of Reasons for Refusal, KR Patent Application No. 10-2017-0170716, dated Mar. 21, 2019, eight pages.

* cited by examiner

*Primary Examiner* — Antim G Shah
(74) *Attorney, Agent, or Firm* — Fenwick & West LLP

(57) ABSTRACT

A static analysis performing method based on voice information may be provided that includes: receiving voice information from a user; determining user's intention to perform static analysis on the basis of the voice information; acquiring history information on static analysis performed in the past in accordance with the user's intention; determining a static analysis target on the basis of the history information; and performing the static analysis on the static analysis target.

12 Claims, 5 Drawing Sheets

STATIC ANALYSIS PERFORMING METHOD BASED ON VOICE INFORMATION AND DEVICE FOR THE SAME

CROSS-REFERENCE TO RELATED APPLICATIONS

This application claims the benefit of Republic of Korea Patent Application No. 10-2017-0170716 filed on Dec. 12, 2017, which is incorporated by reference in its entirety.

BACKGROUND

Field

The present disclosure relates to a static analysis performing method based on voice information and a device for the same, and more particularly to a static analysis performing method in which current static analysis based on user voice information is performed with reference to information on performing static analysis performed in the past, thereby solving the ambiguity of the user voice information and outputting static analysis results by voice, and a device for the same.

Description of the Related Art

A request for general static defect inspection or for a code index measurement is performed by pressing a specific button on a PC screen or by typing commands. Pieces of information that can be identified by the static inspection should be frequently checked without interrupting the coding flow of a developer. According to conventional methods, a developer manually operates the selection of an inspection target and the performing of the inspection through an input device, and resources to be consumed for the inspection may hereby increase. To minimize this, the static analysis can be performed by voice recognition. In this case, a recognized voice may be ambiguous. For example, in a case where a developer sends a command "to perform static analysis" to a PC, if the developer simply sends the command "to perform static analysis," the PC is not able to determine on which part the static analysis should be performed and how the static analysis should be performed. Moreover, it is also difficult for the user to specifically specify a target on which the static analysis is performed or how the static analysis should be performed. Therefore, even when the user simply gives the command "to perform static analysis" only, the PC is required to automatically grasp a user's intention to perform the static analysis (e.g., parts on which the static analysis is performed and processes by which the static analysis is performed, etc.) on the basis of the corresponding command, and is required to perform the static analysis in accordance with the user's intention.

SUMMARY

One embodiment is a static analysis performing method based on voice information. The method includes: receiving voice information from a user; determining user's intention to perform static analysis on the basis of the voice information; acquiring history information on static analysis performed in the past in accordance with the user's intention; determining a static analysis target on the basis of the history information; and performing the static analysis on the static analysis target.

Another embodiment is a static analysis performing device based on voice information. The device includes: a voice acquisition section which receives voice information from a user; a user intention determination section which determines user's intention to perform static analysis on the basis of the voice information; a history information acquisition section which acquires history information on static analysis performed in the past in accordance with the user's intention; a static analysis target determination section which determines a static analysis target on the basis of the history information; and a static analysis performing section which performs the static analysis on the static analysis target.

A computer-readable recording medium according to further another embodiment of the present invention may record a computer program for performing the above-described method.

DETAILED DESCRIPTION

Figure 1:
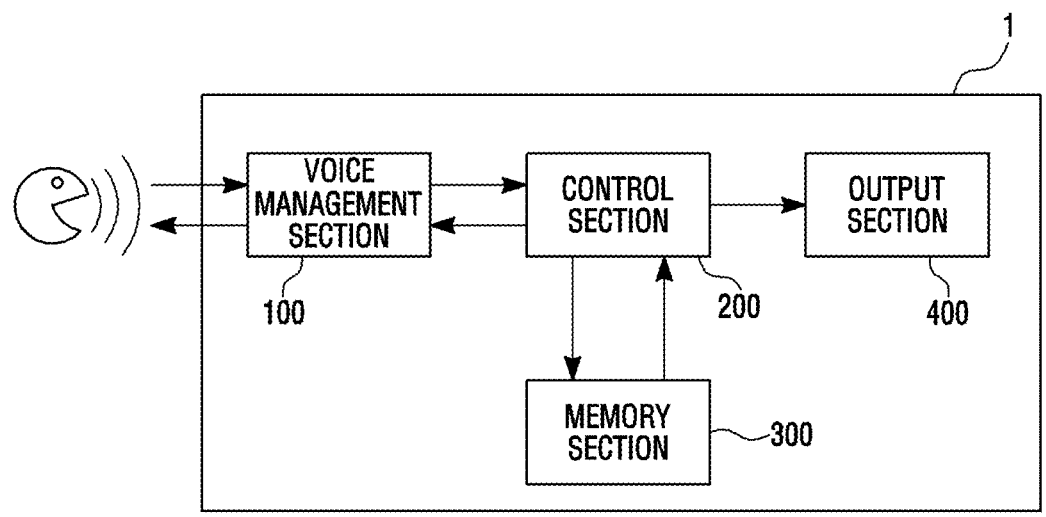
FIGS. 1 to 3 are block diagrams for describing a configuration of a static analysis performing device based on voice information according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a static analysis performing device 1 based on voice information according to an embodiment of the present invention will be described with reference to the accompanying drawings.

Figure 2:
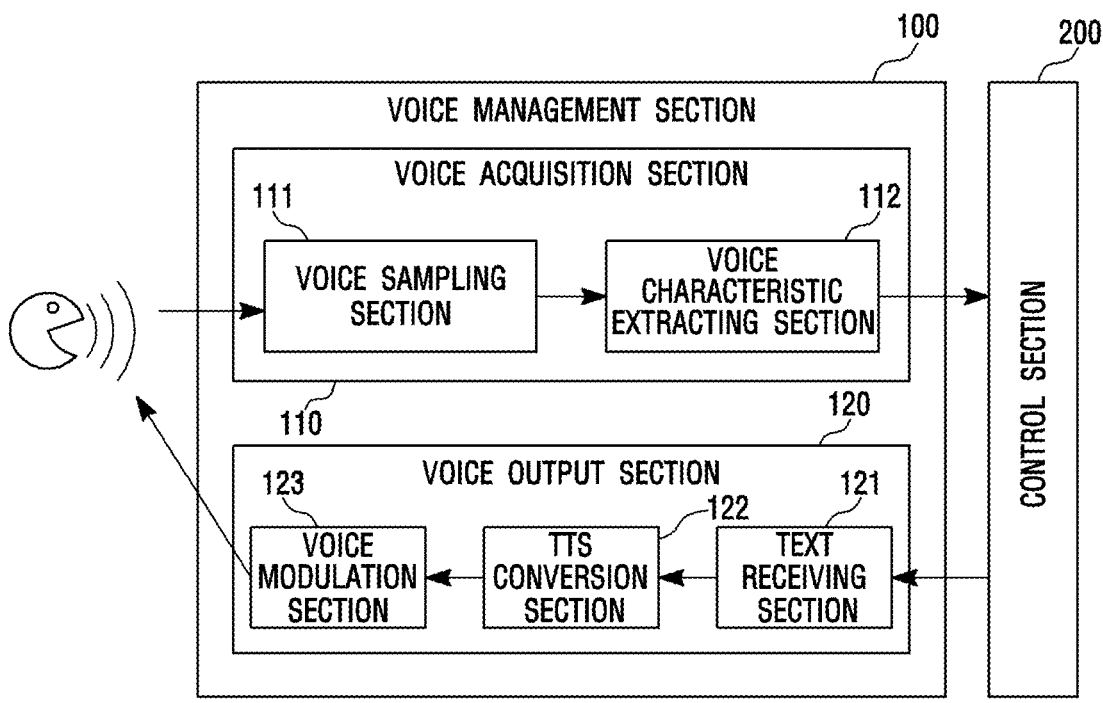
Figure 3:
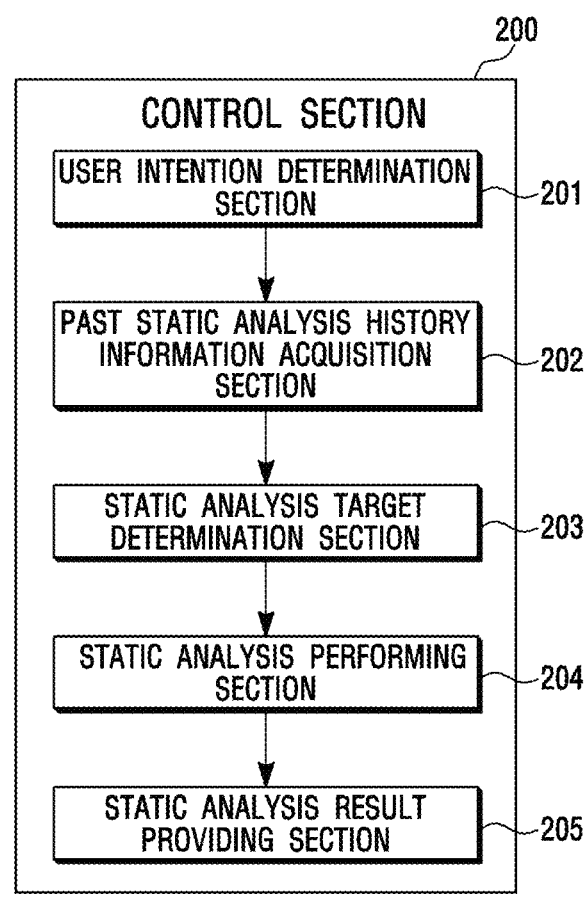

As shown in FIGS. 1 to 3, the static analysis performing device 1 based on voice information according to the embodiment of the present invention may include a voice management section 100, a control section 200, a memory section 300, and an output section 400.

The static analysis performing device 1 based on voice information through virtualization according to the embodiment of the present invention is driven by an operating system, allows software to be installed and edited therein, and includes program modules or hardware. Any device which has computing power by being equipped with the memory section 300 and a microprocessor (hereinafter, referred to as the control section 200) can be used as the static analysis performing device 1 based on voice information according to the embodiment of the present invention. For example, electronic devices such as a desktop computer, a laptop computer, a personal digital assistant (PDA), and a smartphone may be used as the static analysis performing device 1.

In the embodiment of the present invention, the voice management section 100 receives voice information from a user, modulates static analysis results obtained by the control section 200 from a text form to a voice form, and outputs the voice. Specifically, as shown in FIG. 2, the voice management section 100 may include a voice acquisition section 110 and a voice output section 120. The voice acquisition section 110 may include a voice sampling section 111 and a voice characteristic extracting section 112. The voice output section 120 may include a text receiving section 121, a TTS conversion section 122, and a voice modulation section 123. The voice sampling section 111 samples a particular file from another party's voice received by the static analysis performing device 1 based on voice information. The voice sampled by the voice sampling section 111 may be a voice file having a first predetermined format (for example, a way file). The voice characteristic extracting section 112 converts the voice file having the first predetermined format (for example, a way file) into a voice file having a second predetermined format (for example, line spectral frequency, hereinafter, referred to as LSF), and extracts voice characteristics from the converted voice file. In this case, the voice characteristic may include a pitch, an intensity, etc. In the case of converting a way file into an LSF file, the voice characteristic may include an LSF parameter. The foregoing description has taken an example in which the voice characteristic extracting section 112 converts the first predetermined format (way) into the second predetermined format (LSF) and extracts the voice characteristics from the converted voice file. However, it is not excluded that the voice sampling section 111 extracts, without conversion, the voice characteristics from the sampled voice file. The voice characteristics can be stored in the memory section 300.

The text receiving section 121 receives the static analysis result from the control section 200 in the form of a text. The text may be intended to be heard by being converted into voice by using the static analysis performing device 1 based on voice information of the embodiment of the present invention. The TTS conversion section 122 analyzes the grammatical structure of the text received by the text receiving section 121, forms a rhyme, and converts the text into voice in accordance with the formed rhyme. The voice modulation section 123 modulates the voice converted by the TTS conversion section 122 by using the voice characteristics stored in the memory section 300. The TTS conversion section 122 can convert the text and output it as a voice file having the second predetermined format. For example, the text may be converted into a voice file having the LSF format. In this case, the voice modulation section 123 can modulate the voice by using the LSF parameter stored in the memory section 300 and output it as a voice file having the first predetermined format (way). However, the embodiment of the present invention is not limited to this. The voice output section 120 of the embodiment of the present invention can output text information by the voice of a caller. The voice output section 120 may include, for example, a speaker (not shown) provided in the static analysis performing device 1 based on voice information.

The control section 200 controls the static analysis performing device 1 based on voice information in cooperation with the voice management section 100, the memory section 300, and the output section 400. In accordance with the embodiment of the present invention, as shown in FIG. 3, the control section 200 may include a user intention determination section 201, a past static analysis history information acquisition section 202, a static analysis target determination section 203, a static analysis performing section 204, and a static analysis result providing section 205. According to the embodiment of the present invention, the user intention determination section 201 determines, on the basis of the voice information, user's intention for performing the static analysis. The past static analysis history information acquisition section 202 acquires history information on static analysis performed in the past in accordance with the user's intention. The static analysis target determination section 203 determines a static analysis target on the basis of the history information. The static analysis performing section 204 performs static analysis on the static analysis target. The static analysis result providing section 205 provides a static analysis result in the form of a text.

The memory section 300 stores a variety of information of the static analysis performing device 1 based on voice information. The memory section 300 may store a plurality of application programs (or applications) which are executed in the static analysis performing device 1 based on voice information, data for the operation of the static analysis performing device 1 based on voice information, and commands. At least some of these applications may be downloaded from an external server via wireless communication. Also, according to the embodiment of the present invention, the memory section 300 may store the history information on static analysis performed in the past, which has been generated by executing a predetermined program (e.g. rescue time).

The output section 400 may include a touch screen, a monitor, and the like, and may display results processed by the control unit 200. Particularly, according to the embodiment of the present invention, the static analysis result can be displayed through the output section 400.

The foregoing has described the configuration of the static analysis performing device 1 based on voice information according to the embodiment of the present invention. Hereinafter, a static analysis performing method based on voice information will be described.

Figure 4:
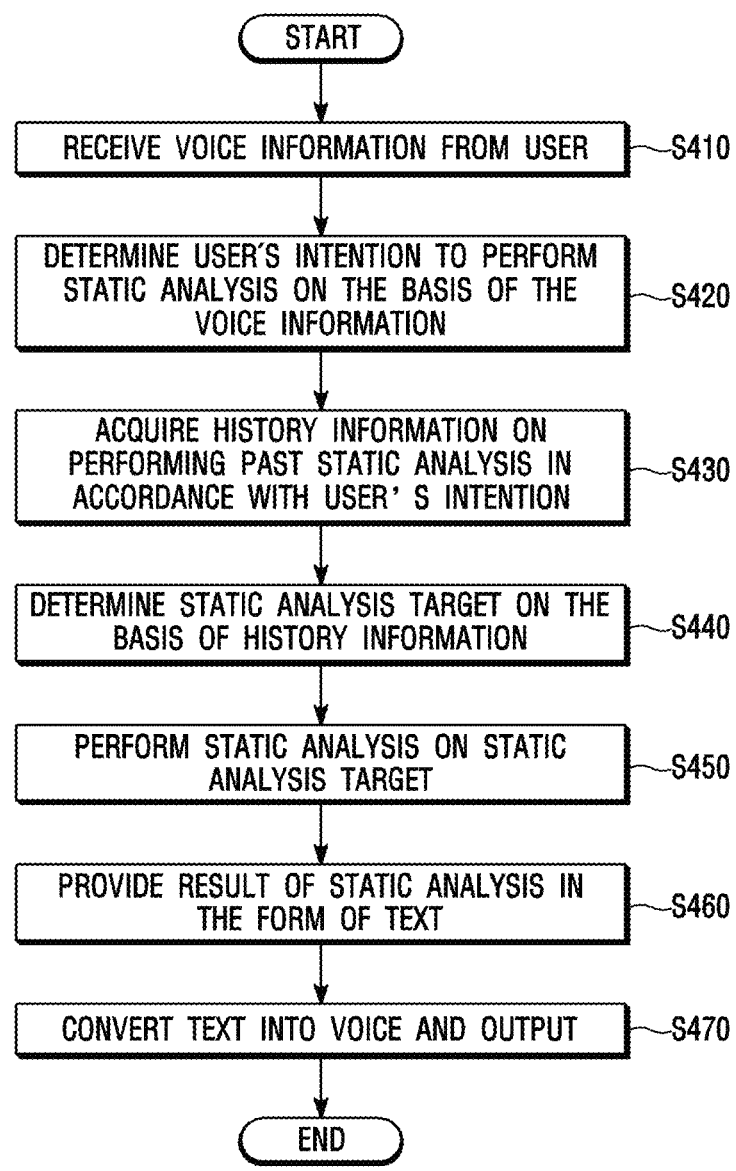
FIG. 4 is a flowchart for describing a static analysis performing method based on voice information according to the embodiment of the present invention.

FIG. 4 is a flowchart for describing a static analysis performing method based on voice information according to the embodiment of the present invention.

As shown in FIG. 4, according to the static analysis performing method based on voice information according to the embodiment of the present invention, the voice acquisition section 110 may receive voice information from the user (S410). As described above, the received voice information may be subjected to a voice sampling step and a voice characteristic extraction step. The extracted voice characteristics may be transmitted to the control section 200. The voice characteristics in the embodiment of the present invention may include a pitch, an intensity, etc., and the user's intention can be determined based on the voice characteristic information. In particular, according to the embodiment of the present invention, the user intention determination section 201 can determine the user's intention to perform the static analysis on the basis of the voice information (S420). Here, in a case where the user sends a command "to perform static analysis" to the static analysis performing device 1 based on voice information, if the user simply sends the command "to perform static analysis," the static analysis performing device 1 based on voice information is not able to determine on which part the static analysis should be performed and how the static analysis should be performed. Moreover, it is also difficult for the user to specifically specify a target on which the static analysis is performed or how the static analysis should be performed. Therefore, even when the user simply gives the command "to perform static analysis" only, the static analysis performing device 1 based on voice information is required to automatically grasp a user's intention to perform the static analysis (e.g., parts on which the static analysis is performed and processes by which the static analysis is performed, etc.) on the basis of the corresponding command, and is required to perform the static analysis in accordance with the user's intention. For this, the control section 200 according to the embodiment of the present invention includes the past static analysis history information acquisition section 202, thereby acquiring the history information on static analysis performed in the past, in accordance with the user's intention through the past static analysis history information acquisition section 202 (S430). The control section 200 may determine the static analysis target on the basis of the history information on static analysis performed in the past, through the static analysis target determination section 203 (S440). For example, the history information on static analysis performed in the past according to the embodiment of the present invention may include at least one of user information, edited source code path information, project information, build system information, cursor position information, 1-minute user development history information collected per second, development tool name information, and development tool usage time information. The 1-minute user development history information collected per second may include at least one of information on a name list of visited functions, list information on files displayed on a screen, information on the number of keyboard typing, and information on a source code change amount. Even though the history information on static analysis performed in the past and the 1-minute user development history information collected per second have been described above, the scope of the present invention is not limited thereto. For example, several minute user development history information collected per second may be used, or information on executed functions or lines may be used.

The history information on static analysis performed in the past may be information that is stored in advance in the memory section 300 by executing a predetermined program, or may be acquired by executing a predetermined program in real time when the voice information is received. For example, a rescue time tool for automatically measuring computer usage time may be run. When the user run the rescue time tool in the past, the result of running the tool is previously stored in the memory section 300. In this case, when voice information is received, the past static analysis history information acquisition section 202 can acquire the previously stored result of the running as the history information on static analysis performed in the past. Further, according to another embodiment, when voice information is received, the tool is immediately run in real time to acquire the history information on static analysis performed in the past.

Based on the history information on static analysis performed in the past, the determination of the static analysis target can be made, for example, as follows.

Figure 5:
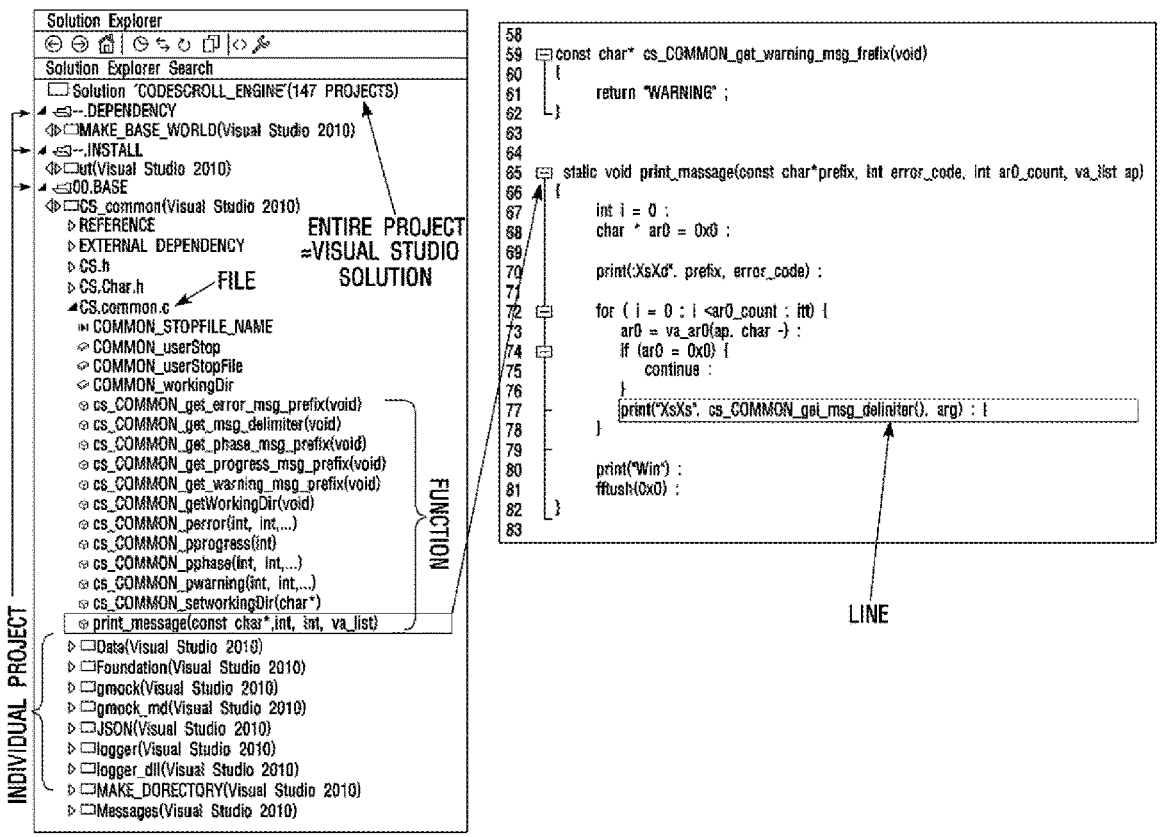
FIGS. 5 to 6 are views referred to for showing an example of an analysis target obtained by using a predetermined development tool according to the embodiment of the present invention.
Figure 6:
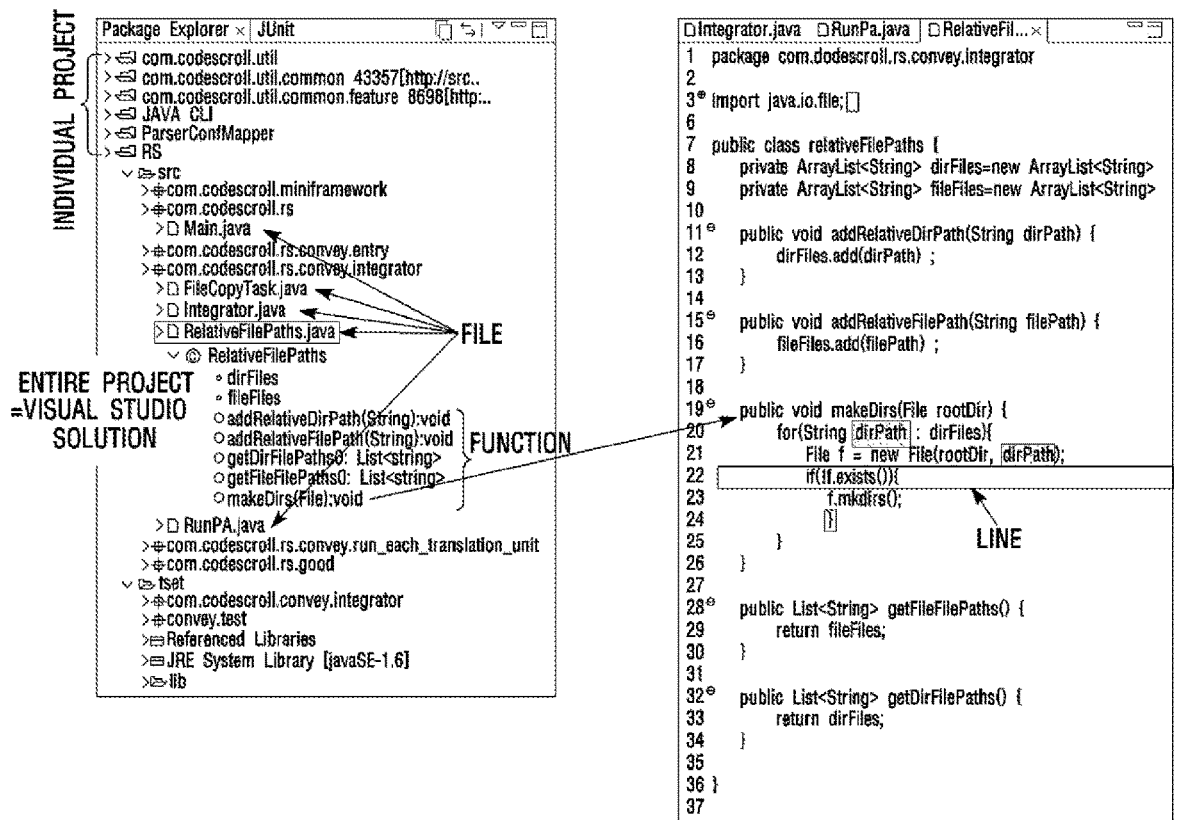

The static analysis target according to the embodiment of the present invention may include an entire project, an individual project, a file, a function, or a line, etc. For example, FIGS. 5 and 6 show an analysis target obtained by using a predetermined development tool. FIG. 5 shows an analysis target in Visual Studio environment which is one of the development tools. FIG. 6 shows an analysis target in Eclipse development environment which is one of the development tools. As shown in FIGS. 5 and 6, it can be found that the static analysis target is hierarchized in the order of entire project>individual project>file>function>line.

According to the embodiment of the present invention, in particular, the static analysis target may be determined according to whether the 1 minute user development history information collected per second is present or not. For example, if the 1-minute user development history information collected per second is not included in the history information at the time of performing static analysis in the past, the static analysis target determination section 203 determines "file" as the static analysis target, and the static analysis may be performed on a per file basis. That is, according to the embodiment of the present invention, the static analysis target may be set on a per file basis by default. However, if the 1-minute user development history information collected per second is included in the history information at the time of performing static analysis in the past, the static analysis target determination section 203 may determine the static analysis target by making reference to the information on the number of keyboard typing and the information on the source code change amount. (1) When the source code change amount is large and one file is displayed on the output section 400, "file" can be determined as the static analysis target. (2) However, if the source code change amount is large, "individual project" can be determined as the static analysis target. (3) On the one hand, if the source code change amount is small and the number of keyboard typing is small, "line" can be determined as the static analysis target. (4) On the other hand, if the source code change amount is small and the number of keyboard typing is large, "function" can be determined as the static analysis target. (5) If the source code change amount is small and the number of keyboard typing is large and there are one or more visited files and many visited functions, "entire project" can be determined as the static analysis target. The above-mentioned (1) to (5) are merely embodiments for determining the static analysis target, and the scope of the present invention is not limited to this.

Here, the information on the source code change amount may include a boundary value that is a criterion for determining whether the source code change amount is large or small, and the boundary value may be input from the user. That is, the boundary value can be adaptively changed according to user feedback, and basically, "10" lines can be used as the boundary value. The information on the number of keyboard typing may include a boundary value that is a criterion for determining whether the number of keyboard typing is large or small. The boundary value can be obtained based on an average value obtained by repeatedly collecting the number of keyboard typing per second for one minute.

When the static analysis target is determined by the static analysis target determination section 203, the static analysis performing section 204 may perform the static analysis on the static analysis target (S450). The result of the static analysis may be provided in the form of text by the static analysis result providing section 205 (S460). The text may be converted into voice through the voice output section 120 and output (S470). The text may be converted into voice through the TTS conversion section 122 and the voice modulation section 123 described above in FIG. 2 and output to the user.

The foregoing embodiments of the present invention may be implemented in the form of a program instruction which is executable by various computer components and may be recorded in a computer-readable recording medium. The computer-readable recording medium may include the program instruction, data file, data structure, etc., individually or in a combination thereof.

The program instruction which is recorded in the computer readable recording medium may be specially designed and configured for the present invention or may be well-known and available to those skilled in the field of computer software.

A non-transitory magnetic medium such as a hard disk, a floppy disk and a magnetic disk, an optical recording medium such as a CD-ROM and DVD, a magnetic-optical medium such as a floptical disk, and a hardware device such as ROM, RAM, a flash memory and the like, which is specially configured to store and run program instructions are included as examples of the computer-readable recording medium. Not only a machine language code which is formed by a compiler but also high-level language code which can be executed by a computer using an interpreter is included as examples of the program instruction. The hardware device may be configured to operate as one or more software modules in order to perform the processes according to the present invention, and vice versa.

The aspects of the present invention may take the form of hardware as a whole, software (including firmware, resident software, microcode, etc.) as a whole or a computer program product implemented in at least one computer readable medium in which a computer readable program code is implemented.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A static analysis performing method based on voice information, the method comprising:
    receiving voice information from a user;
    determining a user's intention to perform static analysis on a basis of the voice information;
    acquiring history information on static analysis performed in the past in accordance with the user's intention;
    determining a static analysis target on a basis of the history information; and
    performing the static analysis on the static analysis target,
    wherein the history information on static analysis performed in the past comprises 1-minute user development history information collected per second,
    wherein the 1-minute user development history information collected per second comprises information on a source code change amount,
    wherein the determining the static analysis target determines the static analysis target as one of an entire project, an individual project, a file, a function, and a line according to a presence or absence of the 1-minute user development history information collected per second and the source code change amount.

2. The static analysis performing method based on voice information of claim 1, comprising:
    providing the static analysis performing result in a form of a text; and
    converting the text into voice and outputting the voice.

3. The static analysis performing method based on voice information of claim 1, wherein the history information on static analysis performed in the past comprises at least one of user information, edited source code path information, project information, build system information, cursor position information, development tool name information, and development tool usage time information.

4. The static analysis performing method based on voice information of claim 3, wherein the 1-minute user development history information collected per second comprises at least one of information on a name list of visited functions, list information on files displayed on a screen, and information on a number of keyboard typing.

5. The static analysis performing method based on voice information of claim 4,
    wherein when the 1-minute user development history information collected per second exists and the source code change amount is greater than a first boundary value, the static analysis target is determined as the individual project,
    wherein when the 1-minute user development history information collected per second exists, the source code change amount is greater than the first boundary value, and the file displayed on the screen is one, the static analysis target is determined as the file,
    wherein when the 1-minute user development history information collected per second exists, the source code change amount is lower than the boundary value, and the number of keyboard typing is lower than a second boundary value, the static analysis target is determined as the line,
    wherein when the 1-minute user development history information collected per second exists, the source code change amount is lower than the boundary value, and the number of keyboard typing is greater than the second boundary value, the static analysis target is determined as the function, and
    wherein when the 1-minute user development history information collected per second does not exist, the static analysis target is determined as the file.

6. The static analysis performing method based on voice information of claim 1,
    wherein the information on a source code change amount comprises a boundary value that is a criterion for determining whether the source code change amount is large or small;
    and wherein the boundary value is capable of being input from the user.

7. The static analysis performing method based on voice information of claim 4, wherein the information on the number of keyboard typing comprises a boundary value that is a criterion for determining whether the number of keyboard typing is large or small;

and wherein the boundary value is obtained based on an average value obtained by repeatedly collecting the number of keyboard typing per second for one minute.

8. The static analysis performing method based on voice information of claim 1, wherein the static analysis target is set on a per file basis by default.

9. The static analysis performing method based on voice information of claim 1, wherein the history information on static analysis performed in the past is information that is stored in advance in a memory section by executing a predetermined program, or is acquired by executing the predetermined program in real time when the voice information is received.

10. A non-transitory computer-readable recording medium for recording a computer program for performing the static analysis performing method according to claim 1.

11. A static analysis performing device based on voice information, the device comprising:
a voice acquisition section which receives voice information from a user;
a user intention determination section which determines a user's intention to perform static analysis on a basis of the voice information;
a history information acquisition section which acquires history information on static analysis performed in the past in accordance with the user's intention;
a static analysis target determination section which determines a static analysis target on a basis of the history information; and
a static analysis performing section which performs the static analysis on the static analysis target,
wherein the history information on static analysis performed in the past comprises 1-minute user development history information collected per second,
wherein the 1-minute user development history information collected per second comprises information on a source code change amount,
wherein the static analysis target determination determines the static analysis target as one of an entire project, an individual project, a file, a function, and a line according to a presence or absence of the 1-minute user development history information collected per second and the source code change amount.

12. The static analysis performing device of claim 11, further comprising:
a static analysis result providing section which provides the static analysis performing result in a form of a text; and
a voice output section which converts the text into voice and outputs the voice.

* * * * *